United States Patent [19]
Gaskill

[11] 3,968,850
[45] July 13, 1976

[54] ELECTROMAGNET WEIGHING BALANCE

[75] Inventor: Charles David Sinclair Gaskill, Haslingden, England

[73] Assignee: International Electronics Limited, Haslingden, England

[22] Filed: Oct. 31, 1974

[21] Appl. No.: 519,773

[52] U.S. Cl. .................................. 177/210; 177/212; 177/185
[51] Int. Cl.² ..................... G01G 3/14; G01G 7/00; G01G 23/10
[58] Field of Search ..................... 177/210, 212, 185

[56] References Cited
UNITED STATES PATENTS

| | | | |
|---|---|---|---|
| 2,801,840 | 8/1957 | Shrader............................ | 177/185 X |
| 2,914,310 | 11/1959 | Bahrs............................... | 177/185 X |
| 2,940,747 | 6/1960 | Eder et al. ....................... | 177/212 X |
| 3,092,197 | 6/1963 | Ecker............................... | 177/212 X |
| 3,186,504 | 6/1965 | Van Wilgen..................... | 177/212 X |
| 3,677,357 | 7/1972 | Baumgartner ................... | 177/212 X |
| 3,799,281 | 3/1974 | Wernitz........................... | 177/212 X |
| 3,802,522 | 4/1974 | Thompson et al. .............. | 177/185 X |

Primary Examiner—George H. Miller, Jr.
Attorney, Agent, or Firm—Scrivener Parker Scrivener & Clarke

[57] ABSTRACT

An electromagnetic weighing balance includes a load support system for supporting the mass to be weighed and including an electromagnetic balance coil disposed in a magnetic field and fed with a balance current producing on the support system a force balancing the weight. The magnitude of the current is taken as a measure of the weight. In order to reduce the effect of vibration the balance coil is fed from a high-impedance source and the balance circuit controlling the balance current in response to displacement of the support system from a datum position includes threshold means increasing the high-frequency gain in response to displacements in excess of threshold levels. Sensor means developing a control signal representative of support system displacement includes a balanced inductive displacement transducer, the output signal from which is combined with components derived by rectifying the energizing alternating voltage to devise a control signal representing the magnitude and direction of the support system.

11 Claims, 3 Drawing Figures

ELECTROMAGNET WEIGHING BALANCE

This invention relates to electromagnetic weighing balances, in which displacement of a load-carrying member from a datum position in response to an applied load is substantially restored by an electromagnetically produced force applied to the load-carrying member, the magnitude of the electric current giving rise to the restoring force being taken as a measure of the weight of the load.

DESCRIPTION OF THE PRIOR ART

Known electromagnetic weighing balances include a movable support system for a mass to be weighed, the support system including an electro-magnetic balance coil disposed in the field of a permanent magnet. Sensing means are provided for developing a control signal representative of any displacement of the support system from a datum position occurring when a mass is supported on the system. A current source controlled by the control signal provides to the balance coil a current such that by the interaction of the current in the coil with the magnetic field in which the coil is immersed a force is developed, acting in the support system, which counterbalances the mass. The magnitude of the current is thus a measure of the weight of the mass.

It is a disadvantage of known systems of this kind that they are sensitive to vibration to an extent which may require the balance to be supported upon complex vibration-absorbing systems if the full accuracy obtainable by the balance is to be available.

It is an additional disadvantage of known systems that errors due to variations in the magnet flux may reduce the available accuracy.

It is an object of the invention to provide an electromagnetic weighing balance having decreased sensitivity to spurious effects.

It is a further object of the invention to provide an electromagnetic weighing balance in which the balance coil is energized by current fed to it from a high-impedance source.

It is an additional object of the invention to provide an electromagnetic weighing balance in which the gain of the feedback circuit controlling the balancing action is increased when the magnitude of the error signal exceeds predetermined thresholds.

It is another object of the invention to provide an electromagnetic weighing balance including an improved displacement sensing means.

It is still another object of the invention to provide means whereby compensation is provided for temporal changes in magnetic field strength of a permanent magnet used in developing the balancing force.

BRIEF DESCRIPTION OF THE DRAWINGS

Preferred features and advantages of an embodiment of weighing apparatus in accordance with the invention will become apparent from the following description taken in conjunction with the accompanying drawings, in which.

DESCRIPTION OF THE PREFERRED EMBODIMENT

Figure 1:
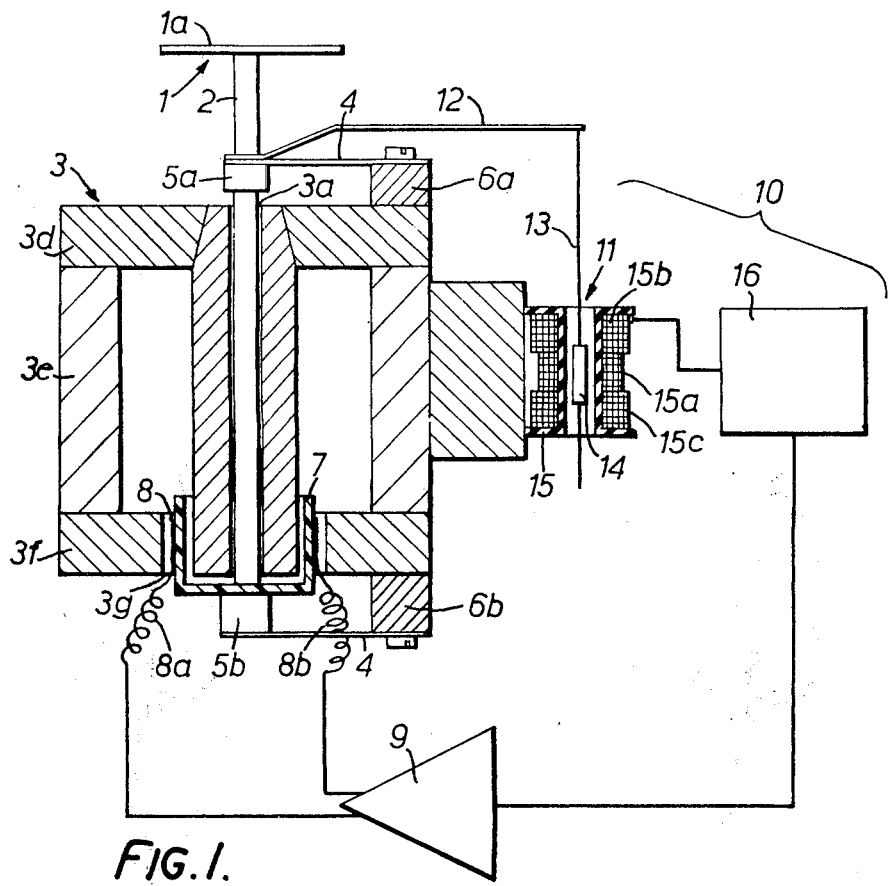
FIG. 1 is a sectional elevation of a part of an electromagnetic weighing balance.

The electromagnetic weighing balance illustrated in FIG. 1 comprises movable system 1 which includes pan 1a for receiving an object to be weighed. Pan 1a is supported upon the upper end of a rod 2 which passes through a central aperture 3a in a magnet system 3, centrally within which it is guided for frictionless movement by laminar springs 4a, 4b each having one end secured to a respective one of collar 5a, 5b fastened upon shaft 2 and its other end secured to a respective one of mounting blocks 6a, 6b secured in turn to magnet system 3.

Magnet system 3 comprises a central cylindrical member 3b of ferromagnetic material pierced axially by bore 3a and having at its upper end a conical portion 3c fitting within a mating hole in a circular end plate 3d of ferromagnetic material. A hollow cylindrical permanent magnet member 3e, polarized in the direction of its length, concentrically surrounds cylindrical member 3b. One end of magnet member 3e abuts against end plate 3d and its other end abuts against a further circular end plate 3f of ferromagnetic material. central circular hole in end plate 3f concentrically surrounds cylindrical member 3b, forming between them an annular gap 3g in which a high and uniform concentration of magnetic flux results. To the lower collar 5b is secured a cup-shaped insulating member 7 of which the cylindrical wall portion 7a extends within the annular gap 3g of magnet system 3. On wall portion 7a is wound a coil 8 to which current is fed from an amplifier 9 by way of flexible leads 8a, 8b. Means 10 are provided to sense the position of the movable system 1 with respect to a datum and to feed to the input of amplifier 9 a control signal representing in sign and magnitude the direction and amount of any displacement of the movable system from the datum position.

In response to the control signal amplifier 9 develops and supplies to coil 8 a current such that the interaction of the current in coil 8 with the magnetic flux in gap 3g, in which the coil is immersed, applies to the movable system 1 a force such as to resist further displacement of the movable system.

The control signal applied to amplifier 9 is advantageously derived by a sensor system 11 as described below with reference to FIG. 2, this sensor system including a movable member coupled for movement with the movable balance system 1 by the arrangement illustrated in FIG. 1. A stiff laminar member 12 mounted upon the balance movable system 1 and specifically upon upper collar 5a, extends laterally of magnet 3 and supports a vertical rod 13 of non-magnetic material having thereon a ferromagnetic core 14 which, as the balance movable system 1 moves, also moves with respect to a coil system 15. Signals developed by the sensor system 11, comprising coil system 15 in conjunction with circuits 16 as described below in relation to FIG. 2, are applied to amplifier 9, which is of the type described below with reference to FIG. 3, thus producing in coil 8 a current sufficient to balance the weight of any load applied to pan 1.

Figure 2:
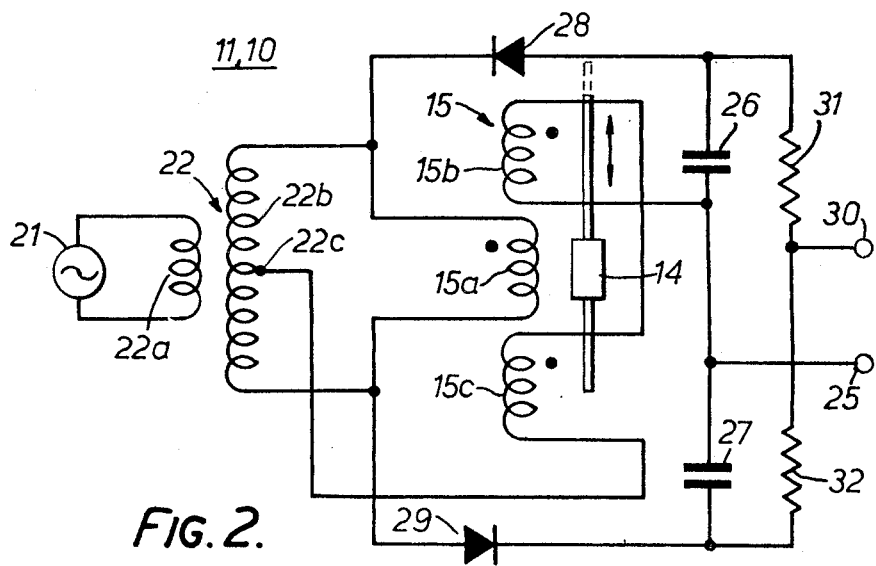
FIG. 2 is a circuit diagram of an error-signal deriving means used in the apparatus of FIG. 1.

In the arrangement illustrated by FIG. 2 a signal source 21 generating a sinusoidal signal of appropriate frequency, for example 50 kHz, feeds the primary winding 22a of a transformer 22 having a centre-tapped secondary winding 22b. The voltage provided by secondary winding 22b is applied to an energizing coil 15a of the coil assembly 15, which includes also a pair of similar sensing coils 15b, 15c symmetrically disposed with respect to energizing coil 15a and connected in series in voltage opposition. Within coil assembly 15 there is arranged for movement axially of the coil assembly the ferromagnetic core 14 arranged as has been described above for movement corresponding with that of the movable system 1 of an electromagnetic weighing balance.

When the load-carrying movable system 1 is in a desired datum position, core 14 is symmetrically disposed with respect to coils 15a and 15b, 15c so that equal and opposite voltages are induced in the two coils and the voltage appearing across the series-connected coil pair is zero. The series combination of coils 15b, 15c is connected between the centre-tap 22c of secondary winding 22b and an output terminal 25. Terminal 25 is also coupled by way of respective series combinations of similar capacitors 26, 27 and oppositely poled diodes 28, 29 to the opposite ends of transformer secondary winding 22b, so that the voltage appearing in the series-connected sensing coils 15b, 15c is combined with components derived by half-wave rectification in oppositely poled diodes 28, 29. A second output terminal 30 is coupled by way of respective, equal resistors 31, 32 to the junction of capacitor 26 with diode 28 and to the junction of capacitor 27 with diode 29.

There thus appears between terminals 25 and 30 an error signal of which the magnitude and polarity are representative of the magnitude and direction of the displacement of core 14, and thus of balance movable system 1 from its desired datum position. The error signal is amplified by means of the circuit arrangement described below with reference to FIG. 3 and the amplified current thus produced is used to energize means generating a force which urges the weight-carrying movable system 1, and thus core 14 also, towards the datum position. The displacement will always be very small.

Core 14 is carried on a non-magnetic support rod 13 which extends (as described in connection with FIG. 1) to a coupling means connecting it with the weight-carrying movable system of which the displacement is to be sensed.

In the circuit arrangement shown in FIG. 3 there are received at terminals 25, 30 an input signal best derived as described with reference to FIGS. 1 and 2 of which the magnitude and polarity represent the amount and direction of displacement from a datum position of a movable load-carrying system of a balance. Input terminal 30 is conveniently grounded.

Terminal 25 is connected by way of a resistor 32 to the inverting input of a first amplifier 33 of which the non-inverting input connected to input terminal 30 by a resistor 36 and is also connected by way of a capacitor 34 to the non-inverting input of a second amplifier 35 of which the inverting input is connected through a resistor 37 equal to resistor 36 to input terminal 30. Each of amplifiers 33, 35 has a permanent negative feedback loop provided by a respective resistor 38, 39 connected between the output and the inverting input of the amplifier.

Figure 3:
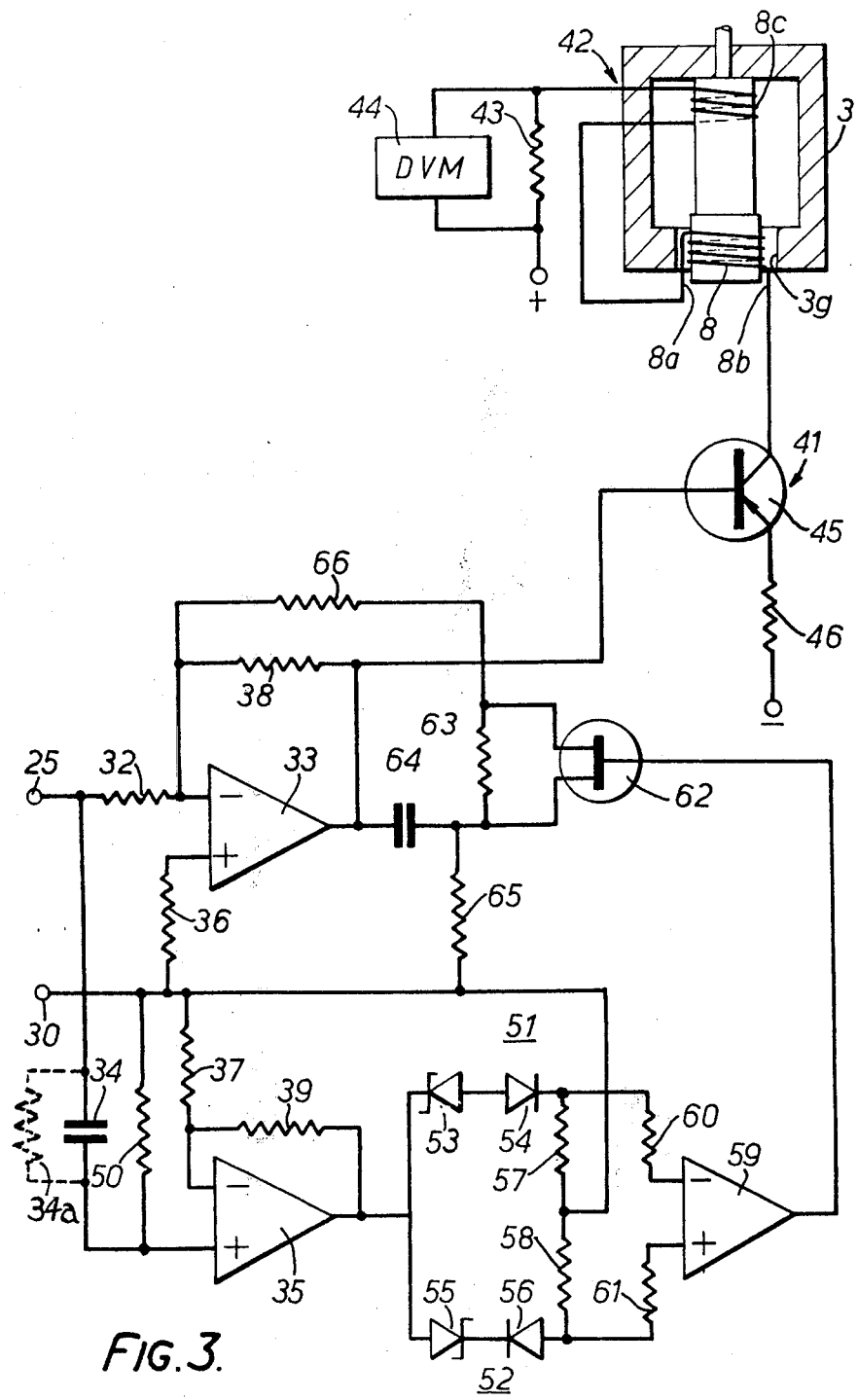
FIG. 3 is a circuit diagram of the balance circuit of an electromagnetic weighing balance.

Because the fixed coil 8c is optional and may not be needed, it is not shown in FIG. 1 but is shown optionally in FIG. 3. The flexible lead 8a of FIG. 1 would be connected to the optional coil 8c, as shown in FIG. 3, and the other flexible lead 8b would be connected to the collector of the transmission 45.

Amplifier 33 provides an output signal over a lead 40 to drive a power amplifier 41 providing current to energize a force-producing means 42, conveniently consisting, as described in relation to FIG. 1, of a movable coil 8 arranged in the gap 3g of a permanent magnet system 3 which is arranged to apply to the load-carrying movable system 1 a force tending to restore the displacement produced by the applied weight. The current applied to force-producing means 42 is measured by passing it through a resistor 43, the potential developed across this resistor being determined by suitable indicator means such as the digital voltmeter 44, as shown which may be calibrated to give a measure of a mass being weighed.

It has been usual to employ as power amplifier 41 a constant-voltage generator, but it is a disadvantage of this arrangement that any voltage produced in the moving coil 8 of force producer 42 as a result of vibration which produces displacement of the coil in the magnet gap will be added to the measured voltage, giving rise to spurious changes in the measured weight. It is therefore advantageous to employ a high-impedance or so-called constant-current source. As shown, this may take the form of a transistor 45 having a resistor 46 in its emitter lead and having moving coil 8 connected in its collector lead.

It is found that a small error in weighing results from any change in the effective value of the permanent magnet produced by the current flowing in moving coil 8 or by changes in flux resulting from movement of the coil or imperfections of the pole pieces. This error may readily be eliminated by placing on the magnet a fixed coil 8c connected in series with coil 8.

It is also desirable to prevent the balance from responding to small perturbations of the displacement sensing system 10 such as those due to vibration, while leaving unaltered its response to larger displacements due to changes in the load to be measured.

To this end amplifier 35 is arranged to respond selectively to higher-frequency voltages applied to it by way of capacitor 34. Capacitor 34, with a resistor 50 shunting the signal path, provides a coupling selectively responsive to these higher frequencies. The output of amplifier 35 is applied equally to two branch circuits 51, 52 each of which includes a respective Zener diode 53, 55 connected in series with an oppositely poled diode 54, 56. The two branch circuits are returned to terminal 30 by way of respective equal resistors 57, 58. Signals appear at the junctions of diodes 54, 56 with resistors 57, 58 when the signals applied to the branch circuits exceed an amplitude which is predetermined by the Zener voltage of diodes 53, 55.

An amplifier 59 has its inputs connected to junctions A, B by way of equal resistors 60, 61 and developes an output voltage when either branch circuit passes current. The signal developed by amplifier 59 is applied to the gate of a field-effect transistor switch 62, which is thus turned off. When turned on, transistor switch 62 effectively short-circuits a resistor 65 connected in a second negative-feedback path for amplifier 33. An integrating capacitor 64 connected to the output of amplifier 33 applies the amplifier signal voltage to a resistor 63 connected to terminal 30. The junction of resistor 64 and capacitor 63 is connected by way of the series combination of resistor 65 with a further resistor 66 to the inverting input of amplifier 33. When resistor 65 is short-circuited by switch 62 the negative feedback applied to amplifier 33 substantially reduces the amplifier gain at higher frequencies so that signals resulting from small perturbations of the weighing platform at these frequencies are substantially attenuated and thus produce only small variations in the current flowing in the moving coil 8a of the force producer and in resistor 43. Large-amplitude input signals however, such as those occasioned by a change of weight on the weighing pan, result in the passage of current in one or the other branch circuits 51, 52 so that switch 62 is turned off and the effective gain of amplifier 33 at high frequencies is increased, allowing a rapid change of current in coil 8 and resistor 43 so that a new equilibrium condition is rapidly attained.

It is also advantageous, though not essential, to connect a resistor 34a in shunt with capacitor 34. This arrangement permits switch 62 to be actuated not only when an abrupt change in the applied signal occurs, but also when the applied signal, though not changing rapidly, attains a large amplitude, thus permitting the balance circuit to respond rapidly to a gradually applied load.

Although only particular embodiments of the invention have been described and illustrated, it will be apparent to those skilled in the art that various modifications and alterations may be made therein. It is therefore the intention in the appended claims to cover all such modifications and alterations as may fall within the true spirit and scope of the invention.

What is claimed is:

1. In an electromagnetic weighing balance including a movable support system for a mass to be weighed, said support system including an electromagnetic balance coil disposed in the field of a permanent magnet, sensor means responsive to displacement of said support system from a datum position to develop a control signal representative of said displacement, a signal-controlled current source feeding to said balance coil a balancing current producing on said support system a force balancing said mass, balance circuit means fed with said control signal and applying a balancing signal derived therefrom to control said current source, and indicator means responsive to said balancing current to provide a measure of said mass, the improvement which comprises constructing said current source as a high impedance source comprising a transistor (45) having emitter, base and collector electrodes, with said balance coil connected between the collector electrode of said transistor and one terminal of a direct voltage source and the emitter electrode of the transistor returned to the other terminal of said voltage source, and means applying said balancing signal to said transistor base electrode, thereby to control the balancing current supplied to said balance coil.

2. The invention claimed in claim 1 wherein said sensor means comprises a support member (12) secured to said support system and supporting a ferromagnetic core (14) movable within a coil system (15) from a median position therein in response to displacement of said support system from said datum position, said coil system comprising a central energizing coil (15a) flanked by mutually similar sensing coils (15b, 15c) symmetrically disposed thereabout and electrically connected in series opposition, an alternating voltage source (21) connected by way of a transformer (22) having a centre-tapped secondary winding (22b) coupled to feed said energizing coil (15a), the series combination of oppositely poled diodes (28, 29) with intervening similar capacitors (26, 27) connected in shunt with said secondary winding (22b), with one end of said series connected sensing coils being connected to said secondary winding centre-tap (22c) and the other end of said coils being connected to the junction of said capacitors (26, 27) and to a first output terminal (25), and with like resistors (31, 32) each connected between a respective junction of a said diode with a said capacitor and a second output terminal (30).

3. The invention claimed in claim 1 wherein said balance coil (8) is connected electrically in series opposition with a similar compensating coil (8c) fixedly placed upon said permanent magnet.

4. The invention claimed in claim 3 wherein said permanent magnet means includes a central cylindrical pole member (3b) concentrically surrounded by a hollow cylindrical permanent magnet member (3e) magnetized in the direction of its length, with said balancing coil surrounding said cylindrical pole member and wherein said compensating coil also surrounds said pole member.

5. The invention claimed in claim 1 wherein said balance circuit means comprises:
   first amplifier means (33) fed with said control signal and providing said balance signal to said current source;
   switchable gain-control means (62–66) operable to increase the high-frequency gain of said first amplifier means from a low value to a higher value in response to a switching signal; and
   threshold means (35–39 & 50–61) responsive to excursions of said control signal in excess of a predetermined magnitude, of either polarity, to apply signal to said gain-control means.

6. The invention claimed in claim 5 wherein said threshold means includes second amplifier means (35) fed with high-frequency components of said control signal, said second amplifier means feeding amplified high-frequency components to a respective input of a difference amplifier (59) by way of a respective series combination of a Zener diode (53,55) an oppositely poled diode (54,56) and a resistor (60,61), said Zener diodes being oppositely poled, whereby said difference amplifier yields an output signal to increase the high-frequency gain of said first amplifier means in response to the high-frequency components of said control signal exceeding the Zener voltage of said diodes.

7. The invention claimed in claim 1 wherein said balance coil (8) is connected between said transistor collector electrode and said voltage source pole in series with a resistor (43) and said indicator means comprises voltmeter means (44) connected to provide an indication corresponding to the voltage appearing across said resistor (43).

8. The invention claimed in claim 7 wherein said voltmeter means is a digital voltmeter.

9. An electromagnetic weighing balance including a movable support system for a mass to be weighed;
   permanent magnet means having a magnet gap in which a magnetic flux is developed;
   said support system including an electromagnetic balancing coil disposed in said magnet gap;
   sensor means responsive to displacement of said support system from a datum position to develop a control signal representative of said displacement, said sensor means comprising a support member secured to said support system and supporting a ferromagnetic core movable within a coil system from a median position therein in response to displacement of said support system from said datum position, said coil system comprising a central energizing coil flanked by mutually similar sensing coils symmetrically disposed thereabout and electrically connected in series opposition, an alternating voltage source connected by way of a transformer having a centre-tapped secondary winding coupled to feed said energizing coil, the series combination of oppositely poled diodes with intervening similar capacitors connected in shunt with said secondary winding, with one end of said series-connected sensing coils being connected to said secondary winding centre-tap and the other end of said coils being connected to the junction of said capacitors and to a first output terminal, and with like resistors each connected between a respective junction of a said diode with a said capacitor and a second input terminal, a signal controlled current source comprising a transistor having emitter, base and collection electrodes, with said balance coil connected between the collector electrode of said transistor and one terminal of a direct-voltage source;

balance circuit means fed with said control signal and applying a balancing signal derived therefrom to control said current source;

and indicator means responsive to said balancing current to provide a measure of said mass.

10. An electromagnetic weighing balance including a movable support system for a mass to be weighed;

permanent magnet means having a magnet gap in which a magnetic flux is developed;

said support system including an electromagnetic balancing coil disposed in said magnet gap;

sensor means responsive to displacement of said support system from a datum position to develop a control signal related to said displacement, said sensor means comprising a support member secured to said support system and supporting a ferromagnetic core movable within a coil system from a median position therein in response to displacement of said support system from said datum position, said coil system comprising a central energizing coil flanked by mutually similar sensing coils symmetrically disposed thereabout and electrically connected in series opposition, an alternating voltage source connected by way of a transformer having a centre-tapped secondary winding coupled to feed said energizing coil, the series combination of oppositely poled diodes with intervening similar capacitors connected in shunt with said secondary winding, with one end of said series-connected sensing coils being connected to said secondary winding centre-tap and the other end of said coils being connected to the junction of said capacitors and to a first output terminal, and with like resistors each connected between a respective junction of a said diode with a said capacitor and a second output terminal;

a signal controlled current source feeding to said balance coil a balance current producing on said support system a force balancing said mass;

balance circuit means fed with said control signal and applying a balancing signal derived therefrom to control said current source, said balance circuit means comprising first amplifier means fed with said control signal and providing said balance signal to said current source;

switchable gain-control means operable to increase the high-frequency gain of said first amplifier means from a low value to a higher value in response to a switching signal; and threshold means responsive to excursions of said control signal in excess of a predetermined magnitude, of either polarity, to apply signal to said gain-control means, said threshold means comprising second amplifier means fed with high-frequency components of said control signal, said second amplifier means feeding amplified high-frequency components to a respective input of a difference amplifier by way of a respective series combination of a Zener diode an oppositely poled diode and a resistor, said Zener diodes being oppositely poled, whereby said difference amplifier yields an output signal to increase the high-frequency gain of said first amplifier means in response to the high-frequency components of said control signal exceeding the Zener voltage of said diodes.

11. An electromagnetic weighing balance including a movable support system for a mass to be weighed;

permanent magnet means having a gap in which a magnetic flux is developed;

said support system including an electromagnetic balancing coil disposed in said magnet gap;

sensor means responsive to displacement of said support system to develop a control signal related to said displacement;

a signal controlled direct current source coupled to supply to said balance coil a balance current of a magnitude to produce on said support system a force balancing said mass;

and indicator means responsive to said current to provide an indication denotive of said mass;

wherein said balance circuit means comprises;

first amplifier means fed with said control signal and providing said balance signal to said current source;

switchable gain-control means (62–66) operable to increase the high-frequency gain of said first amplifier means from a low value to a higher value in response to a switching signal; and threshold means (35–39 & 50–61) responsive to excursions of said control signal in excess of a predetermined magnitude, of either polarity, to apply said switching signal to said gain-control means.

* * * * *